United States Patent
Sano et al.

(10) Patent No.: US 7,399,555 B2
(45) Date of Patent: Jul. 15, 2008

(54) NON-AQUEOUS ELECTROLYTIC SECONDARY BATTERY

(75) Inventors: Hideki Sano, Hirakata (JP); Masaya Sugafuji, Hirakata (JP); Norihiro Yamamoto, Katano (JP); Masaki Kitagawa, Shijonawate (JP); Kiyomi Kato, Moriguchi (JP); Hiroshi Matsuno, Kadoma (JP); Jun Nunome, Yawata (JP); Yutaka Kawatate, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 716 days.

(21) Appl. No.: 10/467,398

(22) PCT Filed: Jun. 11, 2002

(86) PCT No.: PCT/JP02/05818

§ 371 (c)(1),
(2), (4) Date: Dec. 11, 2003

(87) PCT Pub. No.: WO03/056644

PCT Pub. Date: Jul. 10, 2003

(65) Prior Publication Data

US 2005/0118510 A1 Jun. 2, 2005

(30) Foreign Application Priority Data

Dec. 26, 2001 (JP) .............................. 2001-393417

(51) Int. Cl.
H01M 2/16 (2006.01)
(52) U.S. Cl. ...................... 429/248; 429/249; 429/253; 429/254; 429/247; 429/144; 429/129
(58) Field of Classification Search ................ 429/248, 429/249, 253, 254, 247, 144, 129
See application file for complete search history.

(56) References Cited

U.S. PATENT DOCUMENTS

| 5,691,047 A | 11/1997 | Kurauchi et al. |
| 7,063,917 B2 * | 6/2006 | Kinn et al. ................. 429/254 |
| 2002/0034689 A1 | 3/2002 | Hoshida et al. |

FOREIGN PATENT DOCUMENTS

| EP | 0 682 376 A1 | 11/1995 |
| EP | 1 168 469 A2 | 1/2002 |
| JP | 01-167965 A | 7/1989 |
| JP | 04-181651 A | 6/1992 |
| JP | 10-247517 | * 9/1998 |
| JP | 10-247517 A | 9/1998 |
| JP | 11-067211 A | 3/1999 |
| JP | 2000-030685 A | 1/2000 |
| JP | 2000-048794 A | 2/2000 |
| JP | 2000-204174 A | 7/2000 |
| JP | 2000-251943 A | 9/2000 |
| JP | 2002-105235 A | 4/2002 |

* cited by examiner

Primary Examiner—Laura S Weiner
(74) Attorney, Agent, or Firm—Panitch Schwarze Belisario & Nadel LLP

(57) ABSTRACT

A non-aqueous electrolyte secondary battery comprising: an electrode plate assembly; a non-aqueous electrolyte; and an outer jacket accommodating the electrode plate assembly and the non-aqueous electrolyte therein, the electrode plate assembly comprising a positive electrode plate, a negative electrode plate and a separator interposed between the positive electrode plate and the negative electrode plate, the separator comprising a polyolefin resin, wherein (1) the separator comprises at least one layer comprising a polypropylene resin, (2) the layer comprising a polypropylene resin contains an antioxidant with a melting point of 60° C. or higher, and (3) the layer comprising a polypropylene resin and the positive electrode are in contact with one another.

9 Claims, 1 Drawing Sheet

NON-AQUEOUS ELECTROLYTIC SECONDARY BATTERY

TECHNICAL FIELD

The present invention relates to a non-aqueous electrolyte secondary battery. More specifically, the present invention relates to improvement in charge/discharge cycle characteristic and preservation characteristic of a non-aqueous electrolyte secondary battery.

BACKGROUND ART

In recent years, a rapidly increasing number of electronic devices have become portable and cordless, and as power sources for operating these devices, a growing number of non-aqueous electrolyte secondary batteries with a high voltage and a high energy density have come into practical use. As a positive electrode of the non-aqueous electrolyte secondary batteries, a composite oxide of a transition metal and lithium, having a high redox potential, is generally used. As the composite oxide used are lithium cobaltate, lithium nickelate, lithium manganate and the like, as well as an oxide containing plural transition metals. As a negative electrode of the non-aqueous electrolyte secondary batteries, on the other hand, a carbon material is commonly used.

There lies a problem in the non-aqueous electrolyte secondary batteries that a battery capacity gradually decreases with repeated charge/discharge cycles. It is considered as one of the causes of this problem that a transition metal contained in a composite oxide constituting a positive electrode elutes into a non-aqueous electrolyte to deposit on the negative electrode. When a lithium ion secondary battery using lithium cobaltate for the positive electrode is stood still at a high potential of 4.2 V or higher, for example, cobalt in lithium cobaltate is known to elute in the form of cobalt ions. The elution of cobalt from the positive electrode causes destruction of the crystal structure of lithium cobaltate, thereby decreasing a positive electrode capacity. Further, there may be a case where a very small degree of short circuit occurs between the positive electrode and the negative electrode when the cobalt ions having eluted deposit on the negative electrode and the deposited matter goes on growing. Moreover, cobalt having deposited on the negative electrode functions as a catalyst for proceeding decomposition of the non-aqueous electrolyte, leading to gas generation within the battery. Such a problem is particularly conspicuous when a battery in a charged state is placed under a high-temperature atmosphere at 45° C. or higher.

Under such circumstances, Japanese Laid-Open patent publication No. Hei 11-67211 has described that an antioxidant contained in a positive electrode makes it possible to prevent deterioration in charge/discharge cycle characteristic caused by deterioration in positive electrode. Further, Japanese Laid-Open patent publication No. Hei 1-167965 has described that it is effective for a non-aqueous electrolyte to contain an antioxidant. In Japanese Laid-Open patent publication No. Hei 10-247517, on the other hand, an antioxidant is contained in a non-aqueous electrolyte for the purpose of suppressing oxidative decomposition of the non-aqueous electrolyte. Further, an antioxidant has been generally used as an additive in a separator interposed between the positive electrode and the negative electrode of the non-aqueous electrolyte secondary batteries. The reason for the use of the antioxidant in the separator is that the separator is comprised of a polyolefin resin which is relatively vulnerable to oxidation when the resin contacts with the air and is heated.

However, there have also been made reports that addition of an antioxidant into a battery causes a decrease in battery performance. For example, Japanese Laid-Open patent publication No. Hei 12-30685 has described that it is effective to use a separator from which an antioxidant elutes to propylene carbonate in an amount of not more than 2,000 ppm in order to minimize an adverse effect which the antioxidant exerts on battery performance, and that with concentration of the antioxidant in propylene carbonate exceeding 2,000 ppm, the battery performance deteriorates significantly. Further, Japanese Laid-Open patent publication No. Hei 12-251943 has described that the use of a phenolic antioxidant in a separator particularly causes a remarkable decrease in battery capacity at high temperatures.

For the separator comprising a polyolefin resin used is a non-woven fabric or a microporous film with a single-layered or multi-layered structure prepared by extraction, drawing, melt blowing, or the like. Particularly in general use has been a microporous film separator with a structure of a single layer or double layers with a thickness of not more than 30 μm, comprising a polyethylene resin which can be made thinner with ease. Further, the separator comprising a polypropylene resin has been used for the battery together with an additive such as an antioxidant or a stabilizer, since the separator has a difficulty in becoming thinner and tends to be oxidized in terms of the physical properties of the polypropylene resin. For example, Japanese Laid-Open publication No. 2000-204174 has described that a sulfuric antioxidant with an oxidation potential of +4.5 V or higher with respect to lithium is effective and it will neither decompose nor be denatured in the range of a working voltage of the lithium secondary battery.

Despite the disclosures of the various techniques using the antioxidants as thus described, the drawback of the antioxidant that it deteriorates battery performance is conspicuous because the structure of the separator, the physical properties of the antioxidant to be used and the arrangement of the separator and the electrode plate are inappropriate while an excellent function inherent in the antioxidant has not been sufficiently brought out.

DISCLOSURE OF INVENTION

The present invention is based on the finding that arrangement of a particular separator with an antioxidant having specific physical properties contained therein in such a manner as being in contact with a positive electrode enables prevention of deterioration in positive electrode by oxidation more effectively than in the case of adding an antioxidant to the positive electrode, besides prevention of oxidation of a separator.

That is to say, the present invention relates to a non-aqueous electrolyte secondary battery comprising: an electrode plate assembly; a non-aqueous electrolyte; and an outer jacket accommodating the electrode plate assembly and the non-aqueous electrolyte therein, the electrode plate assembly comprising a positive electrode plate, a negative electrode plate and a separator interposed between the positive electrode plate and the negative electrode plate, the separator comprising a polyolefin resin, wherein (1) the separator comprises at least one layer comprising a polypropylene resin, (2) the layer comprising a polypropylene resin contains an antioxidant with a melting point of 60° C. or higher, and (3) the layer comprising a polypropylene resin and the positive electrode are in contact with one another.

The separator may further comprises a layer comprising a polyethylene resin.

It is preferable that the melting point of the antioxidant is 90° C. or higher.

An oxidation potential of the antioxidant with respect to lithium is preferably lower than +4.5 V, and more preferably lower than +4.3 V.

A weight percentage of the antioxidant contained in the layer comprising a polypropylene resin is preferably not less than 0.01 wt % and not more than 1.0 wt %, and more preferably not less than 0.1 wt % and not more than 1.0 wt %.

The antioxidant is preferably at least one selected from the group consisting of phenolic antioxidants and phosphoric antioxidants. In particular, the combined use of the phenolic antioxidant and the phosphoric antioxidant is preferred.

As the phenolic antioxidant preferably used is one expressed by the general formula (1):

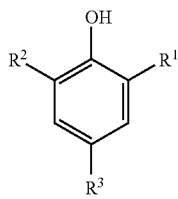

where $R^1$, $R^2$ and $R^3$ may be mutually different and each represents a hydrogen atom or an electron donative group.

As the phosphoric antioxidant preferably use is one expressed by the general formula (2):

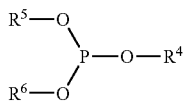

or the general formula (3):

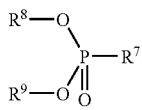

where $R^4$ to $R^9$ may be mutually different and each represents an alkyl group, a phenyl group or the derivative thereof.

It is preferable that the separator further comprises a layer comprising a polypropylene resin in contact with the negative electrode.

BEST MODE FOR CARRYING OUT THE INVENTION

Figure 1:
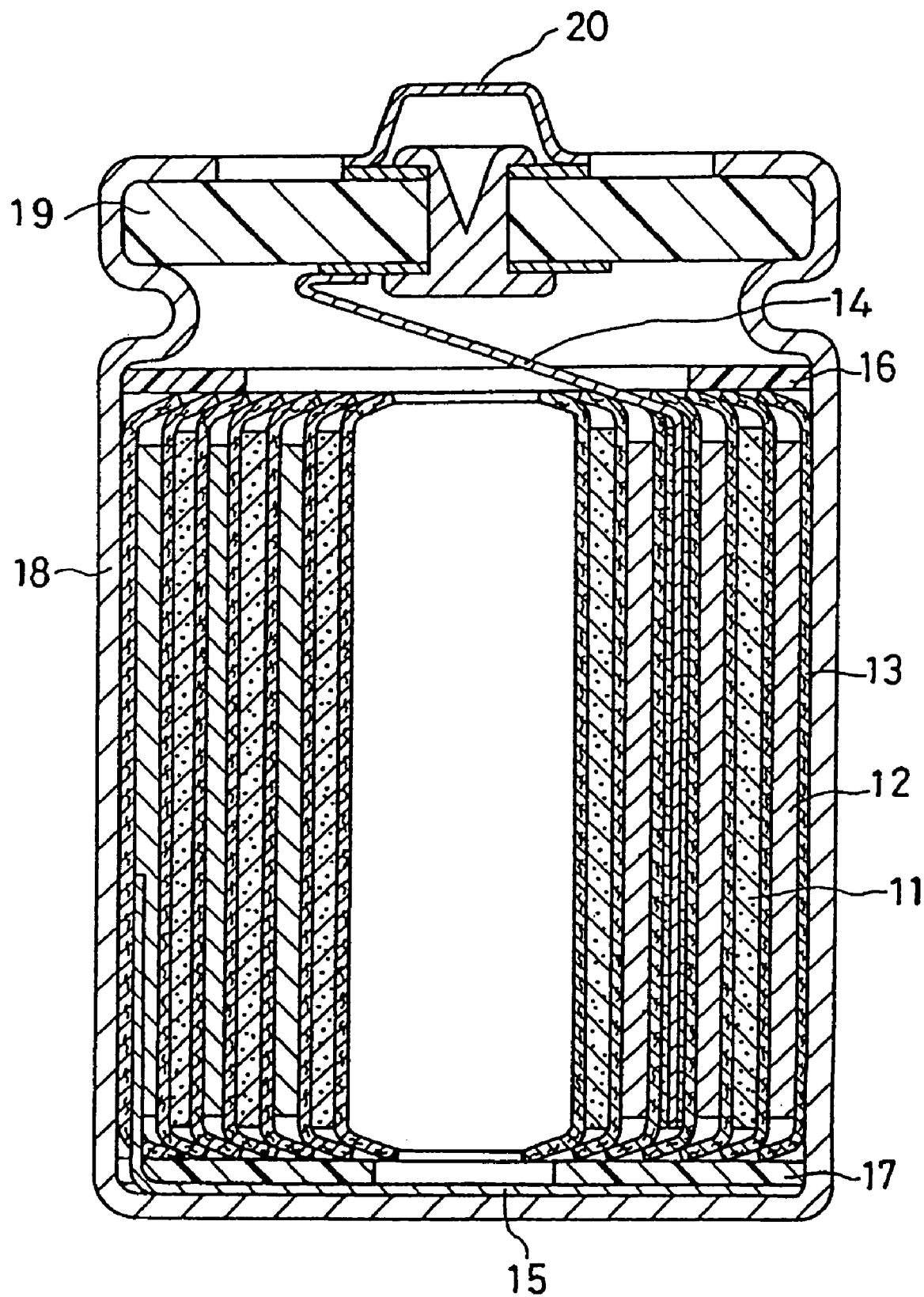
FIG. 1 is a vertical sectional view showing one of examples of a non-aqueous electrolyte secondary battery in accordance with the present invention.

A separator used in the present invention comprises a polyolefin resin with a single-layered or multi-layered structure. Each layer may be comprised of any one of a microporous film, non-woven fabric and woven fabric, and the combination thereof may constitute a separator.

The separator comprises at least one layer comprising a polypropylene resin. While there is no limitation to the thickness of the layer, the preferable thickness is 3 to 30 μm in the case of a separator with a single layer comprising a polypropylene resin. In the case of a double-layered separator, the preferable thickness of each of the layers is 1 to 15 μm. Further, in the case of a triple-layered separator, the preferable thickness of each of the layers is 1 to 10 μm.

The polypropylene resin is more vulnerable to oxidation than a polyethylene resin. It is therefore thought that in the separator which comprises the layer comprising a polypropylene resin, a redox reaction is more likely to occur with a transition metal contained in the positive electrode within the battery, compared with the dominant separator which comprises a polyethylene resin alone. Although details are unknown, it is thought that a product (hereinafter referred to as Product A) obtained by the reaction between the transition metal contained in the positive electrode and the polypropylene resin is reacted with an antioxidant to further give another product (hereinafter referred to as Product B). Product B is considered as greatly contributing to improvement in charge/discharge cycle characteristic and preservation characteristic of the battery, especially in a high-temperature atmosphere.

The layer comprising a polypropylene resin may contain not more than 30 wt % of the polyolefin resin other than the polypropylene resin. When the amount of the polyolefin resin other than the polypropylene resin exceeds 30 wt %, Product B is reduced to such a degree as to hardly obtain the effect of the present invention.

The layer comprising a polypropylene resin is required to contain an antioxidant with a melting point of 60° C. or higher. When the melting point of the antioxidant is lower than 60° C., there is no obtaining the effect of improving the charge/discharge cycle characteristic and the preservation characteristic of the battery. Presumably, this is because the antioxidant with a melting point lower than 60° C. is unable to remain in the separator for a long period of time, especially at high temperatures, and thus elutes into a non-aqueous electrolyte.

The antioxidant having eluted into the non-aqueous electrolyte does not contribute to improvement in charge/discharge cycle characteristic and preservation characteristic. This is because it becomes difficult for the antioxidant having eluted into the non-aqueous electrolyte to be reacted with Product A, causing a remarkable reduction in Product B. Similarly, even when an antioxidant is contained in the non-aqueous electrolyte in such an amount as causing no deterioration in battery performance, the improvement in charge/discharge cycle characteristic and preservation characteristic cannot be expected.

Further, the use of an antioxidant with a melting point of 90° C. or higher increases the effect of the present invention. Presumably, this is because the antioxidant barely elutes into the non-aqueous electrolyte even when the battery is used at a considerably high ambient temperature.

It is considered as preferable that the antioxidant with a melting point of 60° C. or higher is fixed into the separator as long a period of time as possible. For sufficient obtainment of the effect of the present invention, the percentage of the weight (Wox) of the antioxidant contained in the layer comprising a polypropylene resin to the weight (Wpp) of the same layer: (Wox/Wpp)×100(%), is preferably in the range of not less than 0.01 wt % and not more than 1.0 wt %, and more preferably in the range of not less than 0.1 wt % and not more than 1.0 wt %. When the weight percentage is less than 0.01 wt %, there is no effect of improving the charge/discharge cycle characteristic and the preservation characteristic of the battery under a high-temperature atmosphere, and even when the weight percentage exceeds 1.0 wt %, this improvement-effect remains unchanged. Namely, it is considered as necessary to fix the antioxidant preferably in an amount of not less than 100 ppm, and more preferably in an amount of not less than 1,000 ppm, into the layer comprising a polypropylene resin for a long period of time.

Product B obtained by the reaction of Product A with the antioxidant has the function of suppressing the elution of the transition metal contained in the positive electrode to improve the charge/discharge cycle characteristic and the preservation characteristic of the battery. For obtaining an effect attributed to this function, the layer comprising a polypropylene resin needs to be in contact with the positive electrode. Without the contact between the layer comprising a polypropylene resin and the positive electrode, product B is unable to reach the positive electrode and thus unable to suppress the elution of the transition metal contained in the positive electrode.

Moreover, the charge/discharge cycle characteristic of the battery further improves when the layer comprising a polypropylene resin constituting the separator is also in contact with the negative electrode. Presumably, this is because the antioxidant has the effect of protecting a coating film having been formed on the negative electrode.

On the other hand, even when the antioxidant with a melting point of 60° C. or higher is contained in a layer comprising a resin other than the polypropylene resin e.g. a polyethylene resin, and then the layer is brought into contact with the positive electrode, the polyethylene resin is hardly reacted with the transition metal contained in the positive electrode. In this case, accordingly, Product A cannot be obtained and Product B to be given by the reaction between the antioxidant and Product A cannot be obtained, either. It is therefore not possible to suppress the elution of the transition metal contained in the positive electrode.

Since product A, obtained by the reaction between the polypropylene resin contained in the separator and the transition metal, needs to be reacted with the antioxidant so as to obtain Product B, the antioxidant should be certainly contained in the separator. Hence even if the antioxidant with a melting point of 60° C. or higher is contained in the positive electrode, the elution of the transition metal contained in the positive electrode cannot be suppressed. Further, when the antioxidant is contained in the positive electrode, the higher the melting point of the antioxidant, the less likely it becomes that the antioxidant contained in the positive electrode will elute into the non-aqueous electrolyte to reach the separator.

While any antioxidant with a melting point of 60° C. or higher can be applied to the present invention without any specific limitation, especially one with a redox potential lower than +4.5 V with respect to lithium is preferred. In consideration of a working voltage of the battery, a higher redox potential appears more preferable; however, decomposition of the antioxidant due to the electrode reaction can be ignored since the antioxidant with a melting point of 60° C. or higher hardly elutes into the non-aqueous electrolyte. Rather, it is considered as advantageous to have a lower redox potential in obtainment of the effect of the present invention since the reactivity between the antioxidant and Product A thereby increases.

Antioxidants that can be preferably used in the present invention are exemplified below:

(i) Phenolic Antioxidant

There are known phenolic antioxidants ranging from one with a melting point of lower than 60° C. to one with a melting point exceeding 200° C. In the present invention, preferably used for example is a phenolic antioxidant with a melting point of 60° C. or higher, expressed by the general formula (1):

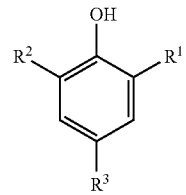

where $R^1$, $R^2$ and $R^3$ may be mutually different and each represents a hydrogen atom or an electron donative group.

The examples of the electron donative group may include an alkyl group, an aryl group, a hydroxyl group and an amine group.

The examples of the phenolic antioxidants usable in the present invention may include 1,1-bis(2'-methyl-4'-hydroxy-5'-t-butylphenyl)butane, 2,2'-methylenebis(4-methyl-6-t-butylphenol), 2,6-di-t-butyl-4-(N,N -dimethylaminomethyl)phenol, 2,2'-methylenebis(4-ethyl-6-t -butylphenol), 4,4'-methylenebis(2,6-di-t-butylphenol), 2,2'-dihydroxy-3,3'-di(α-methylcyclohexyl)-5,5'-dimethyldiphenylmethane, 2,2'-ethylidene-bis(4,6-di-t -butylphenol), 3,9-bis[2-{3-(3-t-butyl-4-hydroxy-5-methylphenyl)propionyloxy}-1,1-dimethylethyl]-2,4,8,10-tetraoxaspiro[5,5]undecane, 4,4'-thiobis(6-t-butyl-m-cresol), 4,4'-thiobis(3-methyl-6-t-butylphenol), bis(3,5-di-t-butyl-4-hydroxybenzyl)sulfide, 4,4'-dithiobis(2,6-di-t-butylphenol), 4,4'-trithiobis(2,6-di-t-butylphenol), 2,2-thiodiethylenebis -[3(3,5-di-t-butyl-4-hydroxyphenyl)propionate], 2,4-bis(n -octylthio)-6-(4-hydroxy-3',5'-di-t-butylanilino)-1,3,5-triazine, N,N'-bis[3-(3,5-di-t-butyl-4-hydroxyphenyl)propionyl]hydrazine, calcium (3,5-di-t-butyl-4-hydroxybenzylmonoethylphosphonate), tris(3,5-di-t-butyl-4-hydroxyphenyl)isocyanurate, tris(3,5-di-t-butyl-4-hydroxybenzyl)isocyanurate, 1,3,5-tris(4-t-butyl-3-hydroxy -2,6-dimethylbenzyl)isocyanurate, and triethyleneglycol-N-bis-3-(3-t-butyl-4-hydroxy-5-methylphenyl)propionate.

Among them particularly preferred are 1,1-bis(2'-methyl-4'-hydroxy-5'-t-butylphenyl)butane, 2,2'-methylenebis(4-methyl-6-t-butylphenol), 4,4'-thiobis(3-methyl-6-t-butylphenol), 2,2-thiodiethylenebis-[3(3,5-di-t-butyl-4-hydroxyphenyl)propionate], tris(3,5-di-t-butyl-4-hydroxybenzyl)isocyanurate, triethyleneglycol-N-bis-3-(3-t -butyl-4-hydroxy-5-methylphenyl)propionate, and the like.

(ii) Phosphoric Antioxidant

There are known phosphoric antioxidants including one with a melting point exceeding 200° C. In the present invention preferably used for example is a phosphoric antioxidant with a melting point of 60° C. or higher, expressed by the general formula (2):

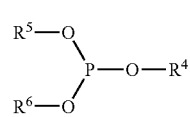

or the general formula (3):

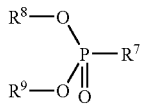

where $R^4$ to $R^9$ may be mutually different and each represents an alkyl group, a phenyl group or the derivative thereof.

The phosphoric antioxidants usable in the present invention may be exemplified by: 2,2'-ethylidenebis(4,6-di-t-butylphenol)fluorophosphite, 2,2'-methylenebis(4,6-di-t-butylphenyl)octhylphosphite, tetrakis(2,4-di-t-butylphenyl)-4,4'-biphenylenediphosphonate, cyclic neo -pentanetetrairbis(2,6-di-t-butyl-4-methylphenylphosphite), 3,5-di-t-butyl-4-hydroxybenzylphosphide-diethylester), and a polymer of hydrogenated bisphenol A and pentaerythritol having a molecular weight of 2,400 to 3,000, represented by:

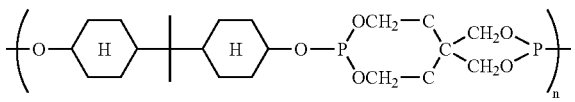

Among them particularly preferred are 2,2'-ethylidenebis(4,6-di-t-butylphenol)fluorophosphite, tetrakis(2,4-di-t-butylphenyl)-4,4'-biphenylenediphosphonate, 3,5-di-t-butyl-4-hydroxybenzylphosphide-diethylester, and the like.

(iii) Sulfuric Antioxidant

Most of sulfuric antioxidants have melting points lower than 60° C.; however, any one with a melting point of 60° C. or higher can be employed in the present invention.

The sulfuric antioxidants usable in the present invention may be exemplified by stearylthiopropionamido and 2-mercapto-6-methylbenzimidazole.

The aforesaid antioxidants may be used singly or in combination of two or more of them. Particularly preferred is the combined use of a phenolic antioxidant and a phosphoric antioxidant. In this case, not less than 10 wt % of the whole antioxidant is preferably the phosphoric antioxidant.

Incidentally, the positive electrode is prepared, for example, by applying a slurry-like positive electrode material mixture onto one or both faces of a positive electrode current collector, which is dried and rolled by pressure to form a positive electrode active material layer. The positive electrode material mixture is prepared by dispersing in a dispersion medium a positive electrode active material, a binder, a conductive agent, a thickener if necessary, and the like. A positive electrode lead is welded to the plain portion of the current collector where the positive electrode active material layer is nonexistent.

As the positive electrode current collector, aluminum foil is preferably used. The aluminum foil is preferably processed into lath or treated by etching. The preferable thickness of the positive electrode current collector is not less than 10 μm and not more than 60 μm.

While there is no particular limitation to the positive electrode active material, for example, a lithium-containing transition metal compound capable of accepting lithium ions as guest is used. For example, composite metal oxides of lithium and at least one metal selected from the group consisting of cobalt, manganese, nickel, chromium, iron and vanadium are preferred, which specifically are $LiCoO_2$, $LiMnO_2$, $LiNiO_2$, $LiCo_xNi_{(1-x)}O_2 (0<x<1)$, $LiCrO_2$, $\alpha LiFeO_2$, $LiVO_2$ and the like. These may be used singly or in combination of two or more of them.

As the binder, any one that can dissolve or disperse in the dispersion medium may be used and is not specifically limited; for example, a fluorocarbon resin, acrylic rubber, denatured acrylic rubber, styrene-butadiene rubber (SBR), an acrylic polymer, a vinyl polymer and the like can be used. These can be used singly or in combination of two or more of them. As the fluorocarbon resin, for example, polyvinylidene fluoride, a vinylidene fluoride-hexafluoropropylene copolymer, polytetrafluoroethylene, and the like are preferred.

As the conductive agent preferably used are acetylene black, graphite, carbon fiber and the like. These can be used singly or in combination of two or more of them.

As the thickener which can be added if required, an ethylene-vinyl alcohol copolymer, carboxymethyl cellulose, methyl cellulose and the like are preferred. These may be used singly or in combination of two or more of them.

As the dispersion medium, one capable of dissolving or dispersing the binder is suitable. When a binder capable of being dissolved or dispersed in an organic solvent is used, an organic solvent such as N-methyl-2-pyrrolidone, N,N-dimethylformamide, tetrahydrofuran, dimethylacetamide, dimethylsulfoxide, hexamethylsulformamide, tetramethyl urea, acetone, methylethylketone or the like is preferably used. These may be used singly or in combination of two or more of them. Further, in the case of using a water soluble binder, water or hot water is preferably used as the dispersion medium.

It is also possible to add a variety of dispersants, surfactants, stabilizers and the like at the time of preparing the above slurry-like mixture.

The applying method is not particularly limited, and the aforesaid slurry-like mixture can be readily applied onto the current collector with the use of, for example, a slit die coater, a reverse roll coater, a RIP coater, a blade coater, a knife coater, a gravure coater, or a dip coater. As for the drying method, although it is more preferable that a method to be taken is closer to natural drying, with productivity taken into consideration, the preferable procedure is to dry the material mixture at a temperature of not lower than 70° C. and not higher than 300° C. for not shorter than 1 minute and not longer than 5 hours.

As for rolling by pressure, it is preferable that with a roll press machine, the layer is rolled by pressure several times with a linear load of not less than 1,000 kg/cm and not more than 2,000 kg/cm, or rolled by pressure as changing the linear load, until the layer obtains a prescribed thickness.

The negative electrode is prepared, for example, by applying a slurry-like negative electrode material mixture onto one or both faces of a negative electrode current collector, which is dried and rolled by pressure to form a negative electrode active material layer. The negative electrode material mixture is prepared by dispersing in a dispersion medium a negative electrode active material, a binder, a conductive aid if necessary, and the like. A negative electrode lead is welded to the plain portion of the current collector where the negative electrode active material layer is nonexistent.

As the negative electrode current collector, copper foil is preferably used. It is preferable that the copper foil is processed into lath or treated by etching. The preferable thickness of the negative electrode current collector is not less than 5 μm and not more than 50 μm.

While there is no particular limitation to the negative electrode active material, for example, a carbon material obtained by baking an organic polymer (a phenol resin, polyacrylonitrile, cellulose or the like), a carbon material obtained by baking coke or pitch, artificial graphite, natural graphite, and the like can be used. These may be used singly or in combination of two or more of them. The particle of the negative electrode active material can be in sphere, flake, bulk or some other form.

As the binder, as well as the thickener which can be added if required, the same ones as the binder and the thickener for the positive electrode can be used. As the conductive aid, the same one as the conductive agent for the positive electrode can be used.

The non-aqueous electrolyte can be prepared by dissolving a solute in a non-aqueous solvent. For example used can be ethylene carbonate, propylene carbonate, butylene carbonate, dimethyl carbonate, diethyl carbonate, γ-butyrolactone, 1,2-dimethoxyethane, 1,2-dichloroethane, 1,3-dimethoxypropane, 4-methyl-2-methyl pentanone, 1,4-dioxane, acetonitrile, propionitrile, buthyronitrile, valeronitrile, benzonitrile, 3-methyl sulfolane, tetrahydrofurane, 2-methyltetrahydrofuran, dimethylformamide, dimethylsulfoxide, dimethylformamide, trimethyl phosphate, triethyl phosphate, and the like. These may be used singly or in combination of two of more of them.

As the solute to be contained in the non-aqueous electrolyte, for example, lithium salt having a strong electron attractive property is used. The examples thereof may include $LiPF_6$, $LiBF_4$, $LiClO_4$, $LiAsF_6$, $LiCF_3SO_3$, $LiN(SO_2CF_3)_2$, $LiN(SO_2C_2F_5)_2$, and $LiC(SO_2CF_3)_3$. These may be used singly or in combination of two of more of them. It is preferable that these solutes are dissolved in the non-aqueous solvent in a concentration of not less than 0.5 M and not more than 1.5 M where M refers to mol/liter.

It is preferable that the non-aqueous electrolyte is added with at least one selected from the group consisting of vinylene carbonate which is a cyclic compound having a C=C unsaturated bonding, and the derivative thereof, as the additive in an amount of not less than 0.01 wt % and not more than 5.0 wt %. Vinylene carbonate has the effect of further improving the charge/discharge cycle characteristic of the battery since it forms on the negative electrode a dense coating film for suppressing decomposition of the non-aqueous electrolyte.

EXAMPLE 1

A cylindrical non-aqueous electrolyte secondary battery 18650 (diameter 18 mm, height 65 mm), as shown in FIG. 1, was fabricated.

(i) Preparation of Positive Electrode 100 parts by weight of $LiCoO_2$ as a positive electrode active material, 3.5 parts by weight of carbon black as a conductive agent, 7 parts by weight of a dispersion of a polyetrafluoroethylene resin (resin content 60 wt %) as a binder and 80 parts by weight of an aqueous solution of carboxymethyl cellulose (CMC) as a thickener (CMC content 1 wt %) were mixed to obtain a paste-like positive electrode material mixture. The obtained positive electrode material mixture was applied onto each face of a current collector made of aluminum foil with a thickness of 20 μm, which was then rolled by pressure and dried in dry air (dew point: −50° C. or lower) at 200° C. for 5 hours. This was cut into prescribed sizes to obtain a positive electrode 11. A lead 14 made of aluminum was connected to the positive electrode 11.

(ii) Preparation of Negative Electrode 100 parts by weight of artificial graphite as a negative electrode active material, 5 parts by weight of a dispersion of styrene-butadiene rubber as a binder (rubber content 48 wt %) and 140 parts by weight of an aqueous solution of carboxymethyl cellulose (CMC) as a thickener (CMC content 1 wt %) were mixed to obtain a negative electrode material mixture. The obtained negative electrode material mixture was applied onto each face of a current collector made of copper foil with a thickness of 14 μm, which was then rolled by pressure and dried in dry air (dew point: −50° C. or lower) at 110° C. for 5 hours. This was cut into prescribed sizes to obtain a negative electrode 12. A lead 15 made of nickel was connected to the negative electrode 12.

(iii) Preparation of Non-Aqueous Electrolyte $LiPF_6$ was dissolved at a rate of 1.2 mol/liter in a mixed solvent of ethylene carbonate and ethylmethyl carbonate in a volume ratio of 1:2 to obtain a non-aqueous electrolyte.

(iv) Formation of Separator

A single-layered separator 13 was used which comprised a layer comprising a polypropylene resin with a thickness of 25 μm. As for an antioxidant to be kneaded into the separator 13 used was a mixture of an equivalent weight of a phenolic antioxidant with a melting point of 130° C.: 2,2'-methylenebis(4-methyl-6-t-butylphenol) and a phosphoric antioxidant with a melting point of 93° C.: tetrakis(2,4-di-t -butylphenyl)-4,4'-biphenylenediphosphonate. The weight percentage of the antioxidant contained in the separator 13 which comprises the single layer comprising polypropylene: (Wox/Wpp)×100, was 0.005 wt %, 0.01 wt %, 0.1 wt %, 0.5 wt %, 1 wt % or 1.5 wt %.

(v) Assembly of Battery

The following was operated in dry air. First, the positive electrode 11 and the negative electrode 12 were laminated with the separator 13 arranged therebetween, which was wound up to obtain a cylindrical electrode plate assembly. The obtained electrode plate assembly was accommodated in a cylindrical iron-made battery case 18 the inside of which had been nickel-plated. An upper insulating plate 16 and a lower insulating plate 17 were provided, respectively, onto the upper part and the lower part of the electrode plate assembly. The nickel-made lead 15 for the negative electrode was connected to the inner bottom face of the case 18, a groove portion was formed around the upper part of the case 18, and then the aluminum-made lead 14 for the positive electrode was welded to a metal portion of a sealing member 19. After the non-aqueous electrolyte was injected into the case 18, the opening of the case 18 was provided with the sealing member 19 having a positive electrode terminal 20 and the open end of the case 18 was clamped to the upper peripheral portion of the sealing member 19 so as to seal the battery. In the aforesaid manner, 10 articles of Cylindrical Battery An (n=1 to 10) as shown in FIG. 1 were accomplished. The capacity of Battery An was 1,800 mAh.

(vi) Finishing Process

Under an atmosphere at 20° C., Battery An was charged for two hours at 360 mA and then discharged at a current of 1,800 mA until a terminal voltage reached 3 V. Subsequently, the battery was charged by a constant current-constant voltage system (hereinafter referred to as "CCCV system") with a voltage of 4.2 V and a maximum current of 1,800 mA until a charging current reached 100 mA. Finally, the battery was aged under an atmosphere at 45C for 3 days.

(vii) Evaluation of Battery

[Preservation Characteristic at 60° C.]

Under an atmosphere at 20° C., 5 articles of Battery An (n=1 to 5) having gone through the finishing process were discharged at a constant current of 1,800 mA until a terminal voltage reached 3 V, charged by the CCCV system with a voltage of 4.2 V and a maximum current of 1,800 mA until a charging current reached 100 mA, and then discharged again at a constant current of 1,800 mA until a terminal voltage reached 3 V, to measure a battery capacity C1.

Next, the battery articles were charged by the CCCV system with a voltage of 4.2 V and a maximum current of 1,800 mA until a charging current reached 100 mA, and then, while being in a charged stated, stored under an atmosphere at 60° C. for 30 days. The articles of Battery An after the storage were discharged at a constant current of 1,800 mA under an atmosphere at 20° C. until a terminal voltage reached 3 V, to check a remaining capacity C2 immediately after the storage. A remaining capacity maintenance rate X1 was then determined by:

$$X1(\%)=(C2/C1)\times100.$$

The average values of the results are shown in Table 1.

Subsequently, under an atmosphere at 20° C., the articles of Battery An (n=1 to 5) were charged by the CCCV system with a voltage of 4.2 V and a maximum current of 1,800 mA until a charging current reached 100 mA, and discharged at a constant current of 1,800 mA until a terminal voltage reached 3 V, to measure a discharge capacity C3. A capacity recovery rate X2 was then determined by:

$$X2(\%)=(C3/C1)\times100.$$

The average values of the results are shown in Table 1.

[Charge/Discharge Cycle Characteristic]

Under an atmosphere at 20° C., the remaining 5 articles of Battery An (n=6 to 10) were subjected to 300 times of a charge/discharge cycle: discharging at a constant current of 1,800 mA until a terminal voltage reached 3 V; and charging by the CCCV system with a voltage of 4.2 V and a maximum current of 1,800 mA until a charging current reached 100 mA. Subsequently, under an atmosphere at 20%, the battery articles were charged by the CCCV system with a voltage of 4.2 V and a maximum current of 1,800 mA until a charging current reached 100 mA, and discharged at a constant current of 1,800 mA until a terminal voltage reached 3 V, to measure a discharge capacity C4. A capacity maintenance rate X3 was then determined by:

$$X3(\%)=(C4/C1)\times100.$$

The average values of the results are shown in Table 1.

COMPARATIVE EXAMPLE 1

Except that a separator was used which comprised a single layer made of polyethylene with a thickness of 25 μm, Battery R1n (n=1 to 10) was fabricated in the same manner as in Example 1, with a weight percentage of the antioxidant contained in the separator which comprised the single layer comprising a polyethylene resin: (Wox/Wpe)×100, of 0.005 wt %, 0.01 wt %, 0.1 wt % or 1.5 wt %. Battery R1n was evaluated in the same manner as in Example 1. The average values of the results are shown in Table 1.

TABLE 1

| (Wox/Wpo)×100 | | 0.005 wt % | 0.01 wt % | 0.1 wt % | 0.5 wt % | 1.0 wt % | 1.5 wt % |
|---|---|---|---|---|---|---|---|
| An | X1(%) | 74 | 81 | 84 | 87 | 88 | 88 |
| R1n | | 73 | 73 | 72 | 70 | 66 | 63 |
| An | X2(%) | 84 | 90 | 94 | 95 | 95 | 95 |
| R1n | | 84 | 84 | 83 | 83 | 82 | 81 |
| An | X3(%) | 76 | 82 | 85 | 88 | 88 | 88 |
| R1n | | 73 | 72 | 71 | 69 | 67 | 65 |

Wpo: Wpp or Wpe

Table 1 reveals that, in Comparative Example 1, the remaining capacity maintenance rate X1 after preservation at 60° C. decreased with increasing weight percentage of the antioxidant because of the use of the separator which comprised the single layer comprising a polyethylene resin. The reason for the decrease in capacity maintenance rate X1 when the weight percentage of the antioxidant is increased is presumably that an excess antioxidant is discomposed since almost no reaction occurs between the transition metal contained in the positive electrode and the layer comprising a polyethylene resin, thereby exerting an adverse effect on the battery.

As opposed to this, in Example 1 where the separator which comprised the single layer comprising a polypropylene resin, there was observed the effect of improving the charge/discharge cycle characteristic and the preservation characteristic when the weight percentage of the antioxidant was not less than 0.01 wt %. It was found, however, that there is almost no effect when the weight percentage of the antioxidant is 0.005 wt %, and that the effect remains unchanged even when it exceeds 1.0 wt %.

EXAMPLE 2

A double-layered separator was used which comprised a layer comprising a polypropylene resin with a thickness of 13 μm and a layer comprising a polyethylene resin with a thickness of 12 μm and, when an electrode plate assembly was constituted, the layer comprising a polypropylene resin and the layer comprising a polyethylene resin were brought into contact with the positive electrode and the negative electrode, respectively.

As for an antioxidant to be kneaded into the layer comprising a polypropylene resin, the same equivalent-weight mixture as that in Example 1 was used. The weight percentage of the antioxidant contained in the layer comprising a polypropylene resin: (Wox/Wpp)×100, was 0.01 wt %, 0.1 wt %, 0.5 wt % or 1 wt %.

As for an antioxidant to be kneaded into the layer comprising a polyethylene resin, the same equivalent-weight mixture as that in Example 1 was used. The weight percentage of the antioxidant contained in the layer comprising a polyethylene resin: (Wox/Wpe)×100, was 0.01 wt %, 0.1 wt %, 0.5 wt % or 1 wt %.

Except that the above configuration was adopted, Battery Bn (n=1 to 10) was fabricated as in Example 1. Battery Bn was evaluated in the same manner as in Example 1. The average values of the results are shown in Table 2.

COMPARATIVE EXAMPLE 2

When an electrode plate assembly was constituted, contrary to Example 2, the layer comprising a polypropylene resin and the layer comprising a polyethylene resin were brought into contact with the negative electrode and the positive electrode, respectively, and except that, Battery R2n (n=1 to 10) was fabricated as in Example 2. Battery R2n was evaluated in the same manner as in Example 1. The average values of the results are shown in Table 2.

EXAMPLE 3

A triple-layered separator was used which comprised two layers comprising a polypropylene resin with a thickness of 8 μm each being arranged on each outer face of the separator and an intermediate layer comprising a polyethylene resin with a thickness of 9 μm.

As for an antioxidant to be kneaded into each of the layers comprising a polypropylene resin, the same equivalent-weight mixture as that in Example 1 was used. The weight percentage of the antioxidant contained in each of the layers comprising a polypropylene resin: $(W_{ox}/W_{pp})\times 100$, was 0.01 wt %, 0.1 wt %, 0.5 wt % or 1 wt %.

As for an antioxidant to be kneaded into the layer comprising a polyethylene resin, the same equivalent-weight mixture as that in Example 1 was used. The weight percentage of the antioxidant contained in the layer comprising a polyethylene resin: $(W_{ox}/W_{pe})\times 100$, was 0.01 wt %, 0.1 wt %, 0.5 wt % or 1.0 wt %.

Except that the aforesaid separator was used, Battery Cn (n=1 to 10) was fabricated as in Example 1. Battery Cn was evaluated in the same manner as in Example 1. The average values of the results are shown in Table 2.

COMPARATIVE EXAMPLE 3

A triple-layered separator was used which comprised two layers comprising a polyethylene resin with a thickness of 8 μm each being arranged on each outer face of the separator and an intermediate layer comprising a polypropylene resin with a thickness of 9 μm.

As for an antioxidant to be kneaded into the layer comprising a polyepropylene resin, the same equivalent-weight mixture as that in Example 1 was used. The weight percentage of the antioxidant contained in the layer comprising a polypropylene resin: $(W_{ox}/W_{pp})\times 100$, was 0.01 wt %, 0.1 wt %, 0.5 wt % or 1 wt %.

As for an antioxidant to be kneaded into each of the layers comprising a polyethylene resin, the same equivalent-weight mixture as that in Example 1 was used. The weight percentage of the antioxidant contained in each of the layers comprising a polyethylene resin: $(W_{ox}/W_{pe})\times 100$, was 0.01 wt %, 0.1 wt %, 0.5 wt % or 1.0 wt %.

Except that the aforesaid separator was used, Battery R3n (n=1 to 10) was fabricated as in Example 1. Battery R3n was evaluated in the same manner as in Example 1. The average values of the results are shown in Table 2.

TABLE 2

|  | $(W_{ox}/W_{po})\times 100$ | 0.01 wt % | 0.1 wt % | 0.5 wt % | 1.0 wt % |
|---|---|---|---|---|---|
| Bn | X1(%) | 81 | 83 | 87 | 87 |
| R2n |  | 73 | 73 | 68 | 64 |
| Cn |  | 81 | 84 | 88 | 89 |
| R3n |  | 73 | 72 | 70 | 65 |
| Bn | X2(%) | 90 | 93 | 94 | 94 |
| R2n |  | 84 | 83 | 82 | 81 |
| Cn |  | 91 | 94 | 95 | 95 |
| R3n |  | 83 | 82 | 80 | 79 |
| Bn | X3(%) | 82 | 85 | 87 | 88 |
| R2n |  | 72 | 71 | 68 | 67 |
| Cn |  | 83 | 88 | 91 | 91 |
| R3n |  | 71 | 70 | 67 | 65 |

TABLE 2-continued

Wpo: Wpp or Wpe

As apparent From Table 2, it became clear that, when the double-layered separator is used which comprises the layer comprising a polypropylene resin and the layer comprising a polyethylene resin, bringing the layer comprising a polypropylene resin into contact with the positive electrode is effective in improving the preservation characteristic and the charge/discharge cycle characteristic.

Further, it was found that the use of the triple-layered separator, which comprises the two layers comprising a polypropylene resin each being arranged on each outer face of the separator and the layer comprising a polyethylene resin arranged between the two layers, also has an effect on the improvement in preservation characteristic and charge/discharge cycle characteristic. The arrangement of the layer comprising a polyethylene resin as the intermediate layer enables the separator to have a shut-down function. With this shut-down function performed, it is possible to enhance safety of the battery under a high-temperature atmosphere at 130' or higher at the time of overcharging or internal short circuit caused by a breakdown in a charger, disenabled charging, or the like. Further, it became clear that bringing the layer comprising a polypropylene resin into contact with the negative electrode is effective at further improving the charge/discharge cycle characteristic.

Meanwhile, it was found that there is no effect of improving the preservation characteristic and the charge/discharge cycle characteristic when the triple-layered separator is used which comprises the two layers comprising a polyethylene resin each being arranged on each outer face of the separator and the layer comprising a polypropylene resin arranged between the two layers.

COMPARATIVE EXAMPLE 4

A separator was used which comprised a single layer comprising a polypropylene resin with a thickness of 25 am. As an antioxidant to be kneaded into the separator only used was a phenolic antioxidant with a melting point of 43° C. and an oxidation potential of lower than 4.5 V: 2,6-di-t-butyl-4-methylphenol. The weight percentage of the antioxidant contained in the separator which comprised the single layer comprising a polypropylene resin: $(W_{ox}/W_{pp})\times 100$, was 0.01 wt %, 0.1 wt %, 0.5 wt % or 1.0 wt %. Except that the aforesaid separator was used, Battery R4n (n=1 to 10) was fabricated as in Example 1. Battery R4n was evaluated in the same manner as in Example 1. The average values of the results are shown in Table 3.

EXAMPLE 4

A separator was used which comprised a layer comprising a polypropylene resin with a thickness of 25 μm. As an antioxidant to be kneaded into the separator only used was a phenolic antioxidant with a melting point of 63° C.: 2,2-thiodiethylenebis-[3(3,5-di-t-butyl-4-hydroxyphenyl)propionate]. The weight percentage of the antioxidant contained in the separator which comprised the single layer comprising a polypropylene resin: $(W_{ox}/W_{pp})\times 100$, was 0.01 wt %, 0.1 wt %, 0.5 wt % or 1.0 wt %. Except that the aforesaid separator was used, Battery Dn (n=1 to 10) was fabricated as in Example 1. Battery Dn was evaluated in the same manner as in Example 1. The average values of the results are shown in Table 3.

EXAMPLE 5

Except that a phenolic antioxidant with a melting point of 75° C. and an oxidation potential of lower than 4.5 V: triethyleneglycol-N-bis-3-(3-t-butyl-4-hydroxy-5-methylphenyl)propionate, was used as an antioxidant, Battery En (n=1 to 10) was fabricated as in Example 4. Battery En was evaluated in the same manner as in Example 1. The average values of the results are shown in Table 3.

EXAMPLE 6

Except that a phosphoric antioxidant with a melting point of 93° C. and an oxidation potential of lower than 4.5 V: tetrakis(2,4-di-t-butylphenyl)-4,4'-biphenylenediphosphonate, was used as an antioxidant, Battery Fn (n=1 to 10) was fabricated as in Example 4. Battery Fn was evaluated in the same manner as in Example 1. The average values of the results are shown in Table 3.

EXAMPLE 7

Except that a phenolic antioxidant with a melting point of 124° C.: 3,9-bis[2-{3-(3-t-butyl-4-hydroxy-5-methylphenyl)propionyloxy}-1,1-dimethylethyl]-2,4,8,10-tetraoxaspiro[5,5]undecane was singly used as an antioxidant, Battery Gn (n=1 to 10) was fabricated as in Example 4. Battery Gn was evaluated in the same manner as in Example 1. The average values of the results are shown in Table 3.

EXAMPLE 8

Except that a phosphoric antioxidant with a melting point of 237° C.: cyclic neo-pentanetetrairbis(2,6-di-t-butyl-4-methylphenylphosphite), was singly used as an antioxidant, Battery Hn (n=1 to 10) was fabricated as in Example 4. Battery Hn was evaluated in the same manner as in Example 1. The average values of the results are shown in Table 3.

EXAMPLE 9

Except that a sulfuric antioxidant with a melting point of 85° C. and an oxidation potential of not lower than 4.5 V: stearylthiopropionamido, was used as an antioxidant, Battery In (n=1 to 10) was fabricated as in Example 4. Battery In was evaluated in the same manner as in Example 1. The average values of the results are shown in Table 3.

TABLE 3

|  | (Wox/Wpp) × 100 | 0.01 wt % | 0.1 wt % | 0.5 wt % | 1.0 wt % |
|---|---|---|---|---|---|
| R4n | X1(%) | 75 | 75 | 76 | 77 |
| Dn |  | 78 | 80 | 81 | 83 |
| En |  | 79 | 82 | 83 | 85 |
| Fn |  | 80 | 82 | 84 | 85 |
| Gn |  | 79 | 83 | 84 | 86 |
| Hn |  | 80 | 83 | 85 | 86 |
| In |  | 77 | 78 | 80 | 82 |
| R4n | X2(%) | 84 | 84 | 84 | 84 |
| Dn |  | 86 | 87 | 88 | 88 |
| En |  | 88 | 91 | 92 | 93 |
| Fn |  | 88 | 92 | 93 | 94 |
| Gn |  | 88 | 92 | 93 | 93 |
| Hn |  | 89 | 93 | 94 | 94 |
| In |  | 85 | 86 | 88 | 89 |
| R4n | X3(%) | 73 | 73 | 73 | 74 |
| Dn |  | 80 | 82 | 84 | 84 |
| En |  | 81 | 84 | 87 | 87 |
| Fn |  | 82 | 85 | 87 | 88 |
| Gn |  | 82 | 86 | 87 | 87 |
| Hn |  | 82 | 85 | 88 | 88 |
| In |  | 76 | 78 | 79 | 81 |

As evident from Table 3, it was found that there is no effect on improvement in preservation characteristic when the melting point of the antioxidant is lower than the evaluation temperature of the preservation characteristic and that even the use of only one selected from the group consisting of phenolic antioxidants and the phosphoric antioxidants is effective when the melting point of the antioxidant is higher than the evaluation temperature of the preservation characteristic. Presumably, this is because, with the melting point of the antioxidant lower than the evaluation temperature of the preservation characteristic, the antioxidant cannot remain in the separator and thus elutes into the non-aqueous electrolyte.

It is to be noted that in the above examples, while the evaluation temperature of the preservation characteristic was set at 60° C. which is a typical ambient temperature for using a battery, the results of Table 3 indicate that the higher the melting point of the antioxidant, the greater the effect of improving the preservation characteristic. In particular, when the melting point of the antioxidant was 90° C. or higher, favorable preservation characteristic and charge/discharge cycle characteristic were exhibited. Also, from a viewpoint that the atmosphere under which a battery is used may conceivably exceed 60° C., it can be said that a higher melting point of the antioxidant is more desirable.

Further, the reason for the more improvement in charge/discharge cycle characteristic when the oxidation potential of the antioxidant was lower is presumably that, with the lower oxidation potential of the antioxidant, the reactivity between the antioxidant and the product (Product A), obtained by the reaction of the polypropylene resin with the transition metal contained in the positive electrode, increased, thereby improving the effect of suppressing oxidation and elution of the transition metal contained in the positive electrode.

EXAMPLE 10

Except that 2.0 parts by weight of vinylene carbonate as an additive was added to the non-aqueous electrolyte per 100 parts by weight of the mixed solvent of ethylene carbonate and ethylmethyl carbonate in a volume ratio of 1:2 as a non-aqueous solvent, Battery Jn (n=1 to 10) was fabricated as in Example 1. Battery Jn was evaluated in the same manner as in Example 1. The average values of the results are shown in Table 4.

COMPARATIVE EXAMPLE 5

Except that 2.0 parts by weight of vinylene carbonate as an additive was added to the non-aqueous electrolyte per 100 parts by weight of the non-aqueous solvent, Battery R5n (n=1 to 10) was fabricated as in Comparative Example 1. Battery R5n was evaluated in the same manner as in Example 1. The average values of the results are shown in Table 4.

TABLE 4

|  | (Wox/Wpo) × 100 | 0.01 wt % | 0.1 wt % | 0.5 wt % | 1.0 wt % |
|---|---|---|---|---|---|
| Jn | X1(%) | 81 | 84 | 87 | 88 |
| R5n |  | 73 | 73 | 69 | 65 |
| Jn | X2(%) | 91 | 94 | 95 | 95 |
| R5n |  | 84 | 83 | 82 | 81 |
| Jn | X3(%) | 85 | 88 | 92 | 93 |
| R5n |  | 74 | 73 | 71 | 69 |

Wpo: Wpp or Wpe

As obvious from Table 4, it was revealed that while the addition of vinylene carbonate to the non-aqueous electrolyte is effective in improving the charge/discharge cycle characteristic, both in the case of using the single layer comprising a polypropylene resin and in the case of using the single layer comprising a polyethylene resin, for the separator, a greater effect is exerted on the improvement in charge/discharge cycle characteristic in the case of using the polypropylene resin.

The addition of vinylene carbonate to the non-aqueous electrolyte allows a dense coating film for suppressing decomposition of the non-aqueous electrolyte to be formed on the negative electrode surface, and it is presumed that the product (Product B), obtained by the reaction between the antioxidant and the product (Product A) obtained by the reaction of the polypropylene with the transition metal contained in the positive electrode, has the function of protecting the aforesaid coating film.

EXAMPLE 11

Except that as a non-aqueous solvent for the non-aqueous electrolyte, a mixed solvent of ethylene carbonate, ethylmethyl carbonate and dimethyl carbonate in a volume ratio of 3:2:5 was used in place of the mixed solvent of ethylene carbonate and ethylmethyl carbonate in a volume ratio of 1:2, Battery Kn (n=1 to 10) was fabricated as in Example 1. Battery Kn was evaluated in the same manner as in Example 1. The average values of the results are shown in Table 5.

COMPARATIVE EXAMPLE 6

Except that as a non-aqueous solvent for the non-aqueous electrolyte, a mixed solvent of ethylene carbonate, ethylmethyl carbonate and dimethyl carbonate in a volume ratio of 3:2:5 was used in place of the mixed solvent of ethylene carbonate and ethylmethyl carbonate in a volume ratio of 1:2, Battery R6n (n=1 to 10) was fabricated as in Comparative Example 1. Battery R6n was evaluated in the same manner as in Example 1. The average values of the results are shown in Table 5.

EXAMPLE 12

Except that 2.0 parts by weight of vinylene carbonate as an additive was added to the non-aqueous electrolyte per 100 parts by weight of the non-aqueous solvent, Battery Ln (n=1 to 10) was fabricated as in Example 11. Battery Ln was evaluated in the same manner as in Example 1. The average values of the results are shown in Table 5.

TABLE 5

|  | (Wox/Wpo) × 100 | 0.01 wt % | 0.1 wt % | 0.5 wt % | 1.0 wt % |
|---|---|---|---|---|---|
| Kn | X1(%) | 81 | 83 | 87 | 87 |
| R6n |  | 70 | 69 | 67 | 63 |
| Ln |  | 81 | 84 | 87 | 88 |
| Kn | X2(%) | 92 | 95 | 96 | 96 |
| R6n |  | 82 | 82 | 81 | 80 |
| Ln |  | 91 | 94 | 95 | 95 |
| Kn | X3(%) | 84 | 88 | 92 | 92 |
| R6n |  | 74 | 73 | 70 | 69 |
| Ln |  | 86 | 90 | 93 | 93 |

Wpo: Wpp or Wpe

As apparent from Table 5, it was found that by the use of the mixed solvent of ethylene carbonate, ethylmethyl carbonate and dimethyl carbonate as the non-aqueous solvent for the non-aqueous electrolyte, the charge/discharge cycle characteristic is improved more than in the case of using the mixed solvent of ethylene carbonate and ethylmethyl carbonate. Further, while there was observed the effect of improving the charge/discharge cycle characteristic both in the case of using the polypropylene resin and in the case of using the polyethylene resin, for the separator, the effect was even greater in the case of using the polypropylene resin.

As having high ion conductivity, dimethyl carbonate causes gas generation in a large amount during storage at high temperatures while enabling improvement in charge/discharge cycle characteristic; however, it is thought that the gas generation during storage at high temperatures can be effectively suppressed by bringing the polypropylene resin containing an antioxidant into contact with the negative electrode to stabilize the film on the negative electrode.

INDUSTRIAL APPLICABILITY

The present invention allows prevention of deterioration in positive electrode by oxidation more effectively than in the case of adding an antioxidant to the positive electrode, besides prevention of oxidation of a separator, resulting in obtainment of a non-aqueous electrolyte secondary battery having an excellent charge/discharge cycle characteristic and preservation characteristic.

The invention claimed is:

1. A non-aqueous electrolyte secondary battery comprising: an electrode plate assembly; a non-aqueous electrolyte; and an outer jacket accommodating said electrode plate assembly and said non-aqueous electrolyte therein, said electrode plate assembly comprising a positive electrode plate, a negative electrode plate and a separator interposed between said positive electrode plate and said negative electrode plate, said separator comprising a multi-porous film having a three-layer polyolefin resin structure, wherein (1) said separator comprises at least a first layer comprising a polypropylene resin and arranged on one outer face of said separator, a second layer comprising a polypropylene resin and arranged on another outer face of said separator, and an intermediate layer comprising a polyethylene resin arranged between the first and second layers;

(2) said first and second layers comprising a polypropylene resin contain an antioxidant; wherein the antioxidant has a melting point of at least 60° C. and an oxidation potential lower than +4.5 V with respect to lithium; and (3) said first layer comprising a polypropylene resin and said positive electrode are in contact with one another.

2. The non-aqueous electrolyte secondary battery in accordance with claim 1, wherein said melting point is at least 90° C.

3. The non-aqueous electrolyte secondary battery in accordance with claim 1, wherein a weight percentage of said antioxidant in said first and second layers comprising a polypropylene resin is not less than 0.01 wt % and not more than 1.0 wt %.

4. The non-aqueous electrolyte secondary battery in accordance with claim 1, wherein said antioxidant is at least one selected from the group consisting of a phenolic antioxidant and a phosphoric antioxidant.

5. The non-aqueous electrolyte secondary battery in accordance with claim 4, wherein said phenolic antioxidant is expressed by the general formula (1):

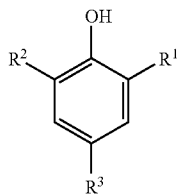

where $R^1$, $R^2$ and $R^3$ may be mutually different and each represents a hydrogen atom or an electron donative group.

6. The non-aqueous electrolyte secondary battery in accordance with claim 4, wherein said phosphoric antioxidant is expressed by the general formula (2):

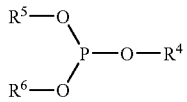

or, the general formula (3):

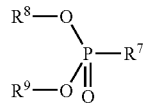

where $R^4$ to $R^9$ may be mutually different and each represents an alkyl group, a phenyl group or the derivative thereof.

7. The non-aqueous electrolyte secondary battery in accordance with claim 1, wherein said second layer comprising a polypropylene resin is in contact with said negative electrode.

8. The non-aqueous electrolyte secondary battery according to claim 1, wherein said antioxidant is at least one phenolic antioxidant selected from the group consisting of 1,1-bis(2'-methyl-4'-hydroxy-5'-t-butylphenyl)butane, 2,2'-methylenebis(4-methyl-6-t-butylphenol), 2,6-di-t-butyl-4-(N,N-dimethylaminomethyl)phenol, 2,2'-methylenebis(4-ethyl-6-t-butylphenol), 4,4'-methylenebis(2,6-di-t-butylphenol), 2,2'-dihydroxy-3,3'-di(α-methylcyclohexyl)-5,5'-dimethyldiphenylmethane, 2,2'-ethylidene-bis(4,6-di-t-butylphenol), 3,9-bis [2-{3-(3-t-butyl-4-hydroxy-5-methylphenyl)propionyloxy}-1,1-dimethylethyl]-2,4,8,10-tetraoxaspiro[5,5]undecane, 4,4'-thiobis(6-t-butyl-m-cresol), 4,4'-thiobis(3-methyl-6-t-butylphenol), bis(3,5-di-t-butyl-4-hydroxybenzyl)sulfide, 4,4'-dithiobis(2,6-di-t-butylphenol), 4,4'-trithiobis(2,6-di-t-butylphenol), 2,2-thiodiethylenebis-[3(3,5-di-t-butyl-4-hydroxyphenyl) propionate], 2,4-bis(n-octylthio)-6-(4-hydroxy-3',5'-di-t-butylanilino)-1,3,5-triazine, N,N'-bis [3-(3,5-di-t-butyl-4-hydroxyphenyl)propionyl]hydrazine, calcium(3,5-di-t-butyl-4-hydroxybenzylmonoethylphosphonate), tris(3,5-di-t-butyl-4-hydroxyphenyl)isocyanurate, 1,3,5-tris(4-t-butyl-3-hydroxy-2,6-dimethylbenzyl)isocyanurate, and triethyleneglycol-N-bis-3-(3-t-butyl-4-hydroxy-5-methylphenyl)propionate.

9. The non-aqueous electrolyte secondary battery according to claim 1, wherein said antioxidant is at least one phosphoric antioxidant selected from the group consisting of 2,2'-ethylidenebis(4,6-di-t-butylphenol)fluorophosphite, 2,2'-methylenebis(4,6-di-t-butylphenyl)octhylphosphite, tetrakis (2,4-di-t-butylphenyl)-4,4'-biphenylenediphosphonate, cyclic neo-pentanetetrairbis(2,6-di-t-butyl-4-methylphenylphosphite), 3,5-di-t-butyl-4-hydroxybenzylphosphide-diethylester), and a polymer of hydrogenated bisphenol A and pentaerythritol having a molecular weight of 2,400 to 3,000.

* * * * *